Oct. 28, 1969 R. W. WATSON 3,474,868
MANUAL EDGER

Filed Aug. 15, 1966 2 Sheets-Sheet 1

INVENTOR.
R. WESLEY WATSON
BY *William J. Miller*
ATTORNEY

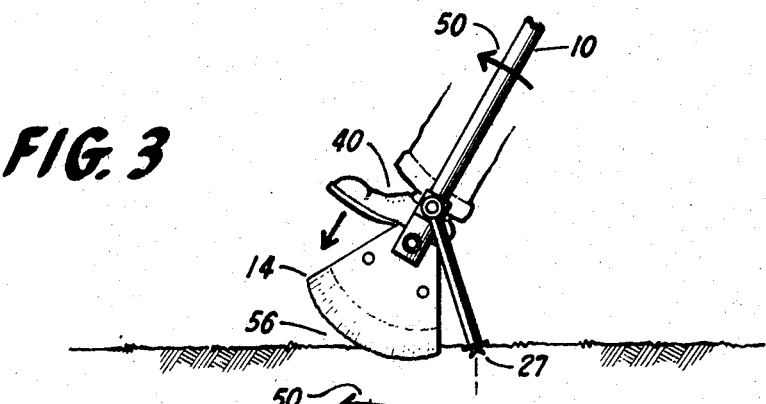
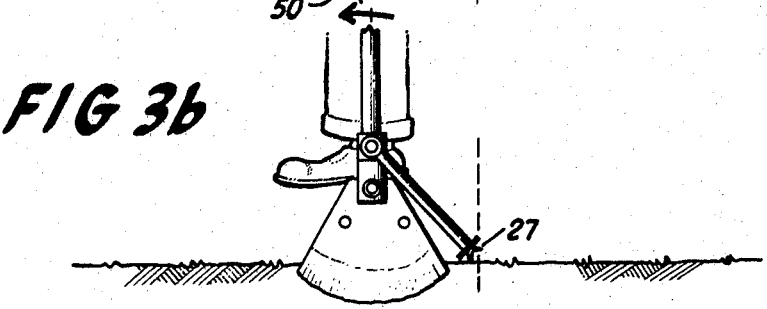
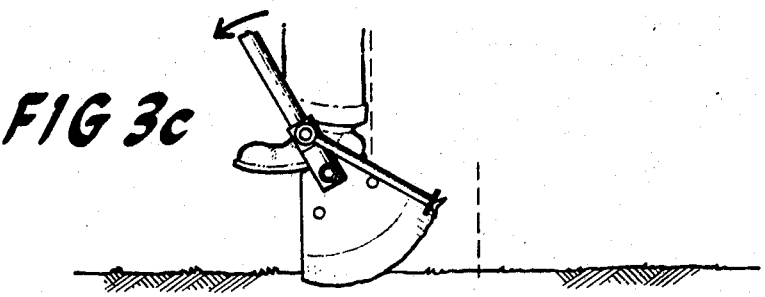
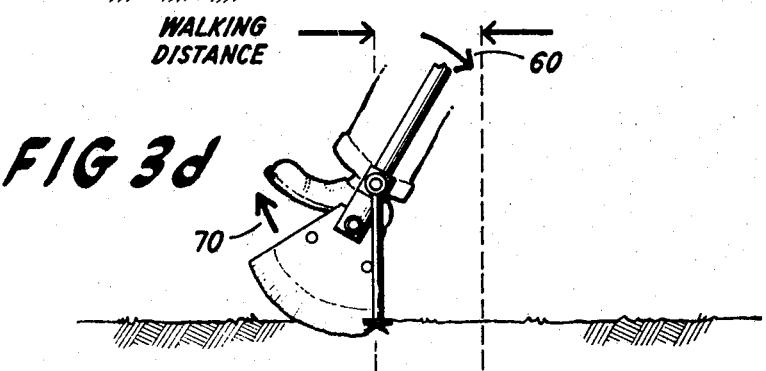

United States Patent Office 3,474,868
Patented Oct. 28, 1969

3,474,868
MANUAL EDGER
Ralph Wesley Watson, 713 N. Osage,
Ponca City, Okla. 74601
Filed Aug. 15, 1966, Ser. No. 572,574
Int. Cl. A01b 63/112, 15/12; A01d 53/12
U.S. Cl. 172—13
4 Claims

ABSTRACT OF THE DISCLOSURE

An edging tool having a disc blade attached to a handle, a walking arm pivotally attached to the walking arm and a stop mounted on the blade and co-operating with the walking arm in a manner to lift the walking arm when the handle is rocked causing the blade to progress continuously in one direction.

This invention relates generally to hand operated edgers, and in particular to hand operated edgers having incorporated thereon means for assisting in the forward movement of the edging operation.

Hand edging is a difficult task. One of the main problems with all hand edgers in the difficulty of getting forward movement of the cutting blade. If a flat blade is used, the entire surface of the blade must be driven into the ground each time a location, such as the grass bordering of a sidewalk, is edged. One solution to the above problem has been to round the cutting edge to reduce the cutting friction of the blade; however, this form of blade still made it difficult to edge with any speed.

Therefore, it is an object of this invention to improve the speed of the edging operation.

It is another object to disclose an edger that is adjustable for blade wear and for various edging needs.

It is a still further object of this invention to disclose an edging tool that is uncomplicated to use, requires a minimum amount of effort to operate, is economical to construct and can be used with great speed.

This invention features an edging tool which has a disc blade attached at approximately its radius to one end of a handle. A footrest is attached traversely to the disc surface on one side of the disc blade, and a walking arm is pivotally attached to the handle; so that the arm extends toward the cutting edge of the blade and pivots in a plane parallel to the surface of the blade. A stop may be provided to limit the maximum arcuate travel of the arm.

This invention also features means for adjusting the pivotal location of the walking arm to allow for blade wear and differences in blade penetration.

These and other features and objects of this invention will become apparent when read in light of the following specification and accompanying drawing in which.

FIGURES 3a, b, c and d are abbreviated schematic drawings depicting the operation of the novel edger of this invention.

Figure 1:
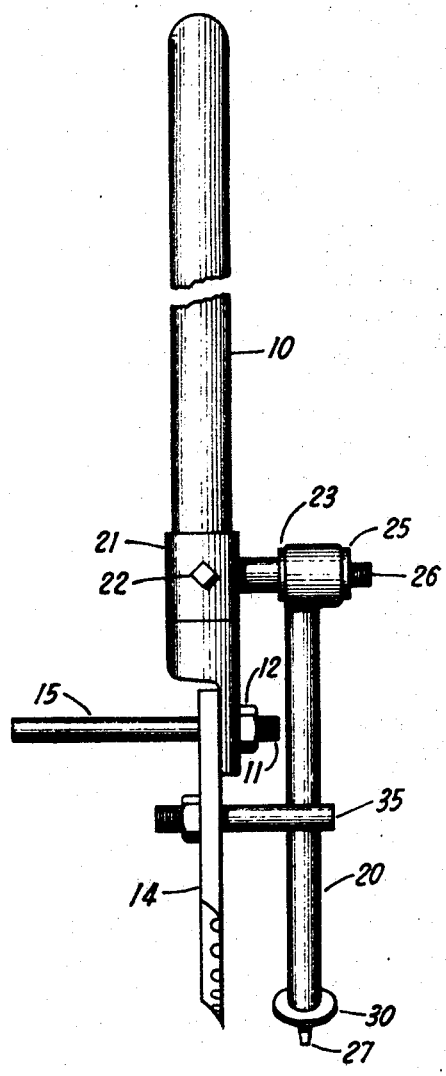
FIGURE 1 is a side view of the hand edger.
Figure 2:
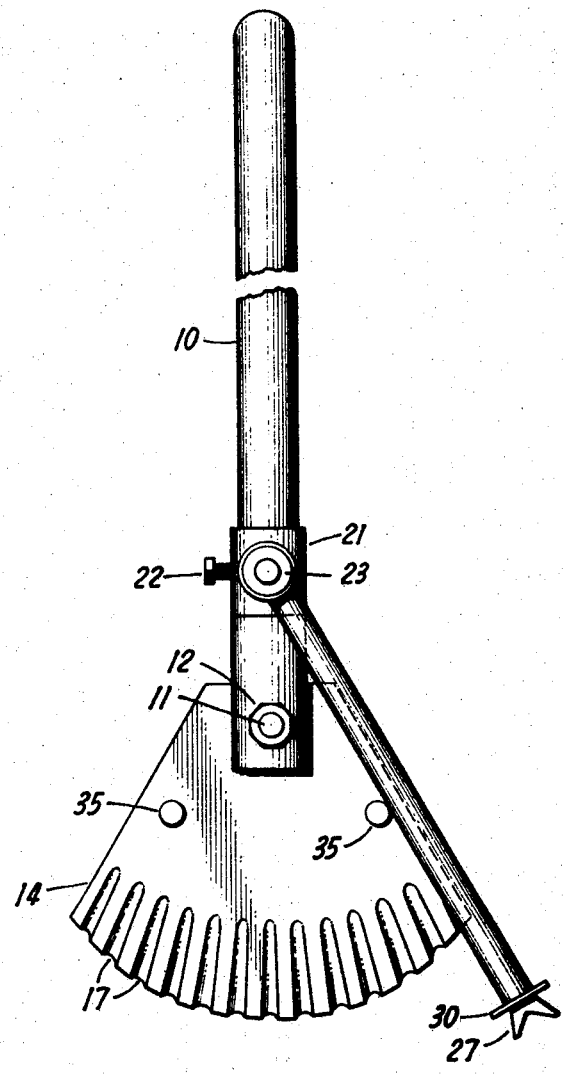
FIGURE 2 is a front view of the hand edger.

Referring to all of the drawings but in particular to FIGURES 1 and 2, the edger of this invention is shown wherein a handle 10 has attached at one end by means of a bolt 11 and nut 12, a blade generally referred to by number 14. Bolt 11 is extended on the other side to form a footrest 15. It should be understood, of course, that any well-known means can be incorporated to attach either the blade 14 or the footrest 15, such as for example, welding. The outer edge or periphery of the cutting blade 14 is sharpened by either tapering the blade gradually, hollowing grinding or serrating the edge by a plurality of grooves extending radially from the periphery as generally indicated by number 17. A serrated edge 17 tends to make edging easier since it traps the grass and holds the grass rather than let the grass move aside when pressure of the blade is applied.

A walking arm generally referred to by number 20 is attached to the handle by a collar 21 which is secured in place by a set screw 22. Transversally attached to collar 21 is a pivot arm 23. Arm 20 is pivotally secured at one end, to the arm 23 by any well-known means such as for example, washers 25 and nut 26.

The other end of walking arm 20 has attached thereto a glass engaging means 27 which in the preferred embodiment consists of a pair of prongs which are sharp. A ring 30 is mounted above the ground engaging means and in use tends to limit the depth to which the walking arm will sink into the ground. A pair of stop means 35 is provided to limit the perpendicular travel of the walking arm. The stop 35 will also tend to lift the walking arm out of engagement with the ground when the maximum accurate motion of the handle is reached.

OPERATION

To understand the operation of the device, reference is made to FIGURES 3a, b, c and d. In FIGURE 3a the edging tool is inserted into the ground by downward force of the foot 40 against footrest 15. Blade 14 will enter the ground and engaging means 27 connected to arm 20 will dig into the ground at point A. Ring 30 will limit the total depth to which the arm 20 will dig in. As arm 10 is rocked forward in the direction of arrow 50, blade 14 will cut the grass at the front edge 56 of the blade.

In FIGURE 3b the handle 10 is shown in a nearly perpendicular position. Prongs 27 are beginning to pull out of point A. In FIGURE 3c the prongs 27 have pulled out of the ground and the arm 20 has struck the stop 35. Now referring to FIGURE 3d when the handle 10 is rocked back as shown in the direction of arrow 60, the arm will engage a new point B distance from point A. The blade 14 will pivot about the pivot arm 23 causing the blade to move in the direction of arrow 70. When pressure is reapplied the blade has been moved forward rapidly and with little effort on the part of the operator. Also the operator has maintained complete control of the edger during the entire operation. Direction is more easily maintained, also since two points, the blade and the prongs will to a large degree determine the direction. If the stop is set too close to the center, the bite will be too large, making the grass cutting operation too difficult. The edger is also useful for either left-handed or right-handed operation by merely rotating the arm against either of the stops 35.

From the foregoing, it is apparent that a novel edger has been described and illustrated that is economical to build, easy to use and requires less effort to operate. It is obvious that modifications can be made to the edger disclosed within the skill of one versed in the art; however, these modifications are well within the scope of the invention made and claimed herein.

What I claim is:

1. A hand operated edger comprising: a handle; a disc blade means attached at one end of the said handle; a footrest attached to the same end of the handle transverse to the axis of the handle; walking arm means pivotally attached to the same end of the said handle and extending toward an extreme end of the said disc blade means, said pivot being mounted so that the movement of the walking arm means will be parallel to the surface of the said disc blade means; stop means on said blade means positioned intermediate the ends of said walk arm means for engagement thereby; and ground engagement means on the other end of the said walking arm means whereby when said disc blade means and said walking arm means engage the ground pressure is applied to said footrest, the walking arm will cause forward movement of the disc blade means.

2. A device as described in claim 1 wherein pivotal attachment of said walking arm is adjustable along the handle whereby a large portion of said disc blade means can come into contact with the ground.

3. A device as described in claim 1 wherein said disc blade is sharpened on the outer circumference by serrating the edge.

4. The device as described in claim 1 wherein said pivotal attachment of said walking arm is adjustable along the handle, and wherein said disc blade means is sharpened on the outer circumference by serrating the edge.

References Cited

UNITED STATES PATENTS

| 1,995,251 | 3/1935 | Hoskins | 56—241 |
| 2,844,084 | 7/1958 | Greenland | 172—16 |

ROBERT E. PULFREY, Primary Examiner

JAMES W. PETERSON, Assistant Examiner

U.S. Cl. X.R.

56—241; 172—352